(12) United States Patent
Ropp et al.

(10) Patent No.: US 7,070,506 B1
(45) Date of Patent: Jul. 4, 2006

(54) SYSTEM AND METHOD FOR PROVIDING PINBALL MACHINE TOURNAMENT PLAY

(75) Inventors: Lonnie Ropp, Schaumburg, IL (US); Joe Blackwell, Worth, IL (US); Dwight Sullivan, West Chicago, IL (US)

(73) Assignee: Stern Pinball, Inc., Melrose Park, IL (US)

( * ) Notice: Subject to any disclaimer, the term of this patent is extended or adjusted under 35 U.S.C. 154(b) by 682 days.

(21) Appl. No.: 10/242,035

(22) Filed: Sep. 12, 2002

(51) Int. Cl.
*A63F 13/00* (2006.01)
(52) U.S. Cl. ..................................... 463/29; 273/119 A
(58) Field of Classification Search .................. 463/25, 463/29, 42; 273/119 A
See application file for complete search history.

(56) References Cited

U.S. PATENT DOCUMENTS

| | | | | |
|---|---|---|---|---|
| 4,974,857 | A | * | 12/1990 | Beall et al. ................. 273/371 |
| 5,275,400 | A | * | 1/1994 | Weingardt et al. ............ 463/12 |
| 5,292,127 | A | | 3/1994 | Kelly et al. |
| 5,318,298 | A | | 6/1994 | Kelly et al. |
| 5,700,007 | A | | 12/1997 | Kelly et al. |
| 5,743,523 | A | | 4/1998 | Kelly et al. |
| 5,816,918 | A | * | 10/1998 | Kelly et al. .................... 463/16 |
| 5,890,715 | A | * | 4/1999 | Gomez et al. ............ 273/118 A |
| 5,917,725 | A | * | 6/1999 | Thacher et al. ................ 700/91 |
| 5,971,397 | A | * | 10/1999 | Miguel et al. ............... 273/371 |
| 6,036,188 | A | | 3/2000 | Gomez et al. |
| 2002/0059205 | A1 | * | 5/2002 | Graham et al. ................ 707/3 |
| 2002/0119824 | A1 | * | 8/2002 | Allen .......................... 463/42 |

OTHER PUBLICATIONS

Professional and Amateur Pinball Association's Guide to Sega's Maverivk, Jan. 11, 1995 pp. 1-5.*
NBA Fast Break Game Man, Feature Adjustments, pp. 1-31 thru 1-34.
Titanic, Sega Pinball, Inc., Melrose Park, Illinois.
Gottlieb, Strikes N' Spares, Game Features, pp. 1-3, 13, and 59, 1995 Premier Technology.

* cited by examiner

*Primary Examiner*—John M. Hotaling, II
(74) *Attorney, Agent, or Firm*—Gary R. Jarosik

(57) ABSTRACT

A pinball machine having an inclined playfield supporting a plurality of game features and a rolling game ball. A processor is used to control the function of the pinball machine including permitting game play in a tournament mode wherein game play allows a player to earn a score that is evaluated to determine if a prize is to be awarded. The processor may also allow for game play in a normal mode wherein game play does not provide for a prize to be awarded. When both game play modes are available, a player operated switch may be provided for permitting player selection of the mode of play at the beginning of each game.

48 Claims, 3 Drawing Sheets

SYSTEM AND METHOD FOR PROVIDING PINBALL MACHINE TOURNAMENT PLAY

FIELD OF INVENTION

This invention relates to the operation of pinball machines and, more particularly, to a system and method for providing pinball machine tournament play.

BACKGROUND

Pinball machines are generally known in the art. However, known pinball machines suffer various deficiencies. For example, users of pinball machines often lose interest in playing pinball machines once they have mastered the play of a particular pinball machine playfield. Therefore, in an effort to maintain the interest of players of pinball machines and/or to increase the profitability of pinball machines, it is proposed to provide one or more pinball machines with tournament play capabilities.

SUMMARY OF THE INVENTION

To this end, in a pinball machine having an inclined playfield supporting a plurality of game features and a rolling game ball, a processor is used to control the function of the pinball machine so as to permit game play in a tournament mode wherein game play allows a player to earn a score that is evaluated to determine if a prize is to be awarded. The processor may also allow for game play in a normal mode wherein game play does not provide for a prize to be awarded. When both game play modes are available, a player operated switch may be provided for permitting player selection of the mode of play at the beginning of each game.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
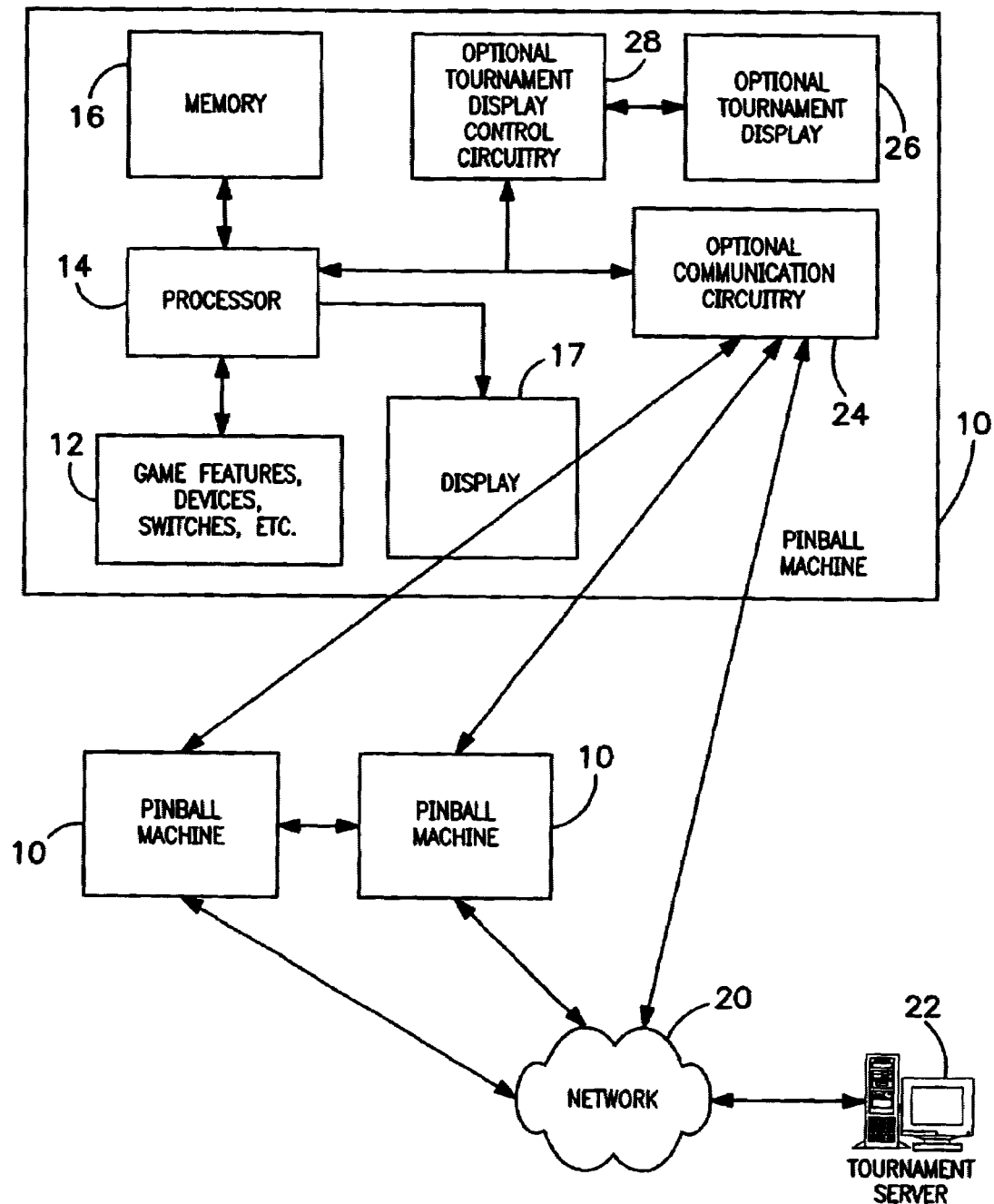
FIG. 1 illustrates exemplary components of a pinball machine and exemplary pinball machine networks.

With reference to the figures, a pinball machine 10 generally includes a cabinet which houses an inclined playfield. The playfield supports a game piece such as a rolling ball and has a plurality of playfield features and devices 12. These features and devices 12 may take a number of forms including, but not limited to, bumpers, targets, various lights or other illumination devices, three-dimensional objects or figures, targets which are fixed or moveable, elements that are capable of selectively holding and releasing the ball, etc. Certain of the features and devices 12 allow points to be scored when activated by the ball.

When play of the pinball machine commences, typically by the player using credits on the pinball machine, which may be placed on the pinball machine by, for example, depositing money, tokens, using a swipe card, etc., the ball is introduced into the playfield. The ball may be introduced onto the playfield for, by way of example only, shooting the ball with a ball propelling element such as a plunger. The ball enters the playfield via a shooter lane that is positioned along a side of the playfield such that the ball travels from a lower end of the playfield to an upper end of the playfield. Ball introduction mechanisms may be of the manually-actuated type or, alternatively, may be automatically actuated in response to depression of a shooter button mounted to the front of the cabinet. Once the ball is positioned on the playfield, the ball tends to roll, under the force of gravity, in the direction of a pair of flippers located at a bottom end part of the inclined playfield. The flippers, which are activated by buttons on the sides of the cabinet, are used by the skilled player to propel the ball back into the playfield to prevent the ball from exiting the playfield via an outhole. The outhole can be considered to be the entrance to a path by which to the ball is returned to the ball launching mechanism. Typically, the outhole is positioned adjacent to a ball trough that is used to feed balls to the ball launching mechanism. In some circumstance, it may be desired to provide a player with the ability to activate posts or the like to prevent the ball from exiting the playfield via exit lanes or via a space between the flippers. It will therefore be appreciated that a skilled player can use the flippers (and posts if provided) to prevent the ball from leaving the playfield such that play of a pinball game 10 can be extended indefinitely since the sole means by which the ball can exit the playfield is preferably positioned behind the flippers, i.e., an outhole is located adjacent to the lower end of the playfield.

To protect the playfield, the playfield is generally covered by a transparent panel of glass or plastic through which a player may view the playfield and its contents. Typically, the pinball machine 10 also includes a backbox that is mounted generally above the playfield and usually at an end thereof opposite a player station which is adjacent the location of the flippers and plunger. The backbox would generally include circuitry such as a processor 14 linked to input devices such as switches, buttons, etc., and output devices such as solenoids, a display 17, lights, etc. which are located on the playfield, positioned in the backbox, or otherwise associated with the pinball machine. Instructions for controlling the operation of the pinball machine 10, via the processor 14, are stored in a memory 16. Other locations for this circuitry are also contemplated such as, for example, under the playfield.

For use in enhancing the play of the pinball machine 10, the pinball machine 10 may be provided with the ability to allow a player to select the mode of play desired, e.g., league play mode, tournament play mode, or normal play mode. While described in the context of allowing the player to choose between these three types of game play modes, it is to be understood that the pinball machine 10 need not include all three game play mode variations. In normal play mode, conventional game rules are typically in effect. For example, during normal play, the pinball machine 10 may be equipped for auto-percentaging and the player may be provided with the opportunity to earn extra balls by scoring points or activating targets. As will be readily understood, an earned extra ball allows the player to place an additional ball onto the playfield beyond the number of rolling balls that are normally allotted for game play when game play commences. Similarly, during normal play, the player may be provided with the opportunity to earn a chance to replay the game or to earn extra game credits, for example, by activating a particular game feature, by achieving a particular point score, and/or by having a point score component that matches a randomly generated number.

In tournament play mode, a set of game rules that differ from those offered during normal play might apply. For example, it may not be desired to allow a player to earn extra balls, replays, or game credits during tournament play. Similarly, to remove randomness from game play, it might be desired to award mystery game play features in a set order rather than in a random order as is typically done in normal play. Still further, percentage game features might not be automatically advanced as they are during normal play.

To allow a player to select between normal play, league play, or tournament play, the pinball machine 10 may be provided with player activatable switches that function to inform the pinball machine 10 of the type of play desired in order that the pinball machine 10 can adjust its rules of play. Commencement of game play may also require the pinball machine 10 to have game credits. In some instances, the pinball machine operator may select how money credits are bought for the amount of cash/token(s) deposited with the pinball machine 10. The amount of credits for playing each of the various types of games may also be settable by the operator of the pinball machine. For example, normal play may require 2 credits while league/tournament play may require 4 credits. Thus, when the player selects which type of game play mode the player desires, the pinball machine 10 will deduct the credits required for the game play mode selected from the total credits found on the pinball machine 10. Indication of the desired type of game play may be provided, by way of example only, with a player activating a "start" button located in the front molding of the game cabinet for normal play, the "start" button while activating the left flipper button for league play, or a "tournament" button, also provided on the front molding of the game cabinet, for tournament play.

In tournament play, players may compete against one another to determine which player(s) have achieved the highest pinball game play score(s) during a given period of time. Thus, in tournament play, the pinball machine 10 need only track those players that have a game play score that is higher than a given threshold, for example, a game play score that ranks as the overall highest, the top five highest, the top forty highest, etc. Relevant game play scores, player information, etc., may also be maintained in a memory device 16. League play can be performed according to the rules established for either normal or tournament play with the added feature that game play scores for each player are recorded and such scores can be accumulated for players over multiple tournament play periods, can be aggregated to determine team scores, etc.

Figure 2A:
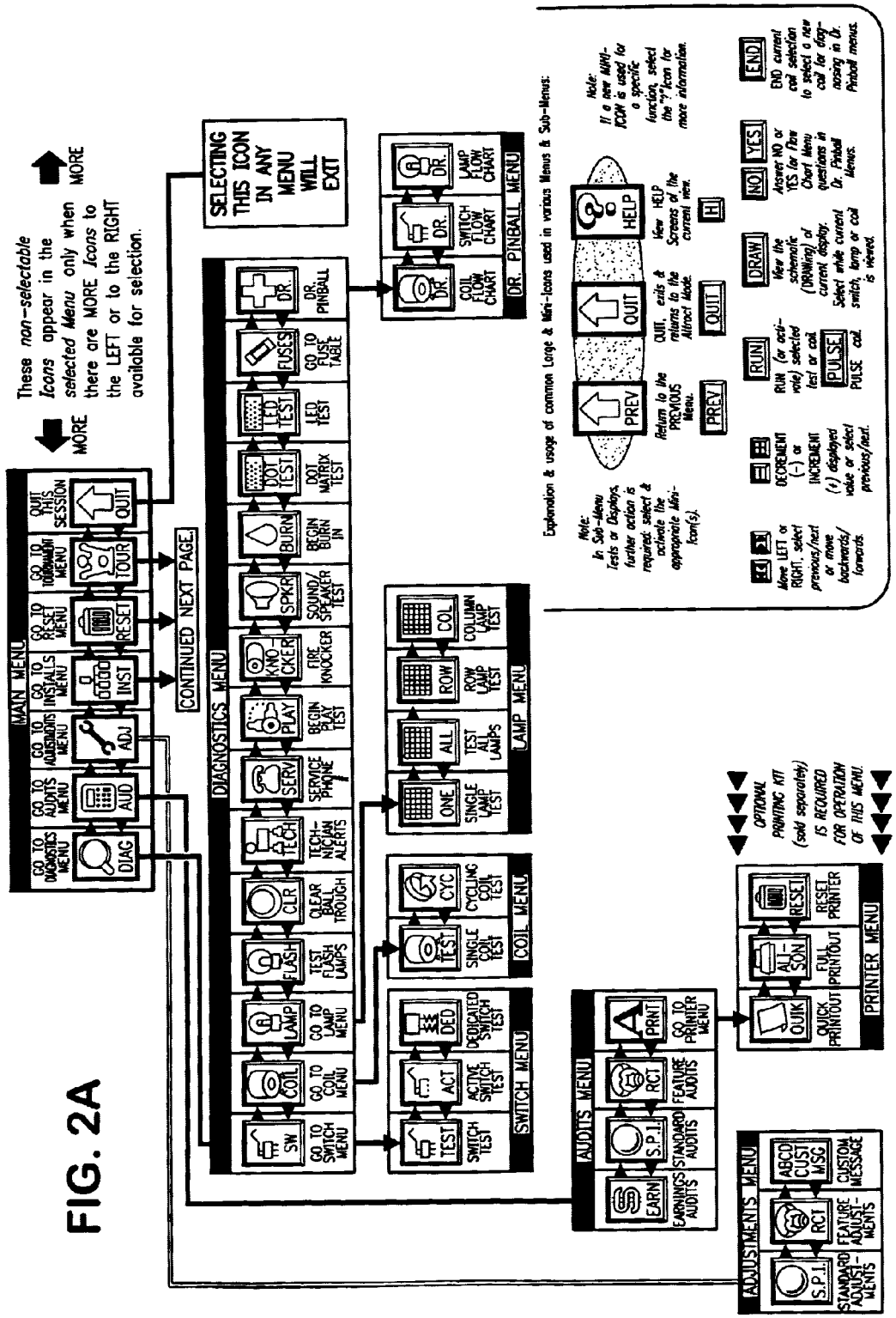
FIGS. 2a and 2b illustrate an exemplary menu system for, among other things, setting up a pinball machine for tournament play and for accessing information regarding completed tournaments.
Figure 2B:
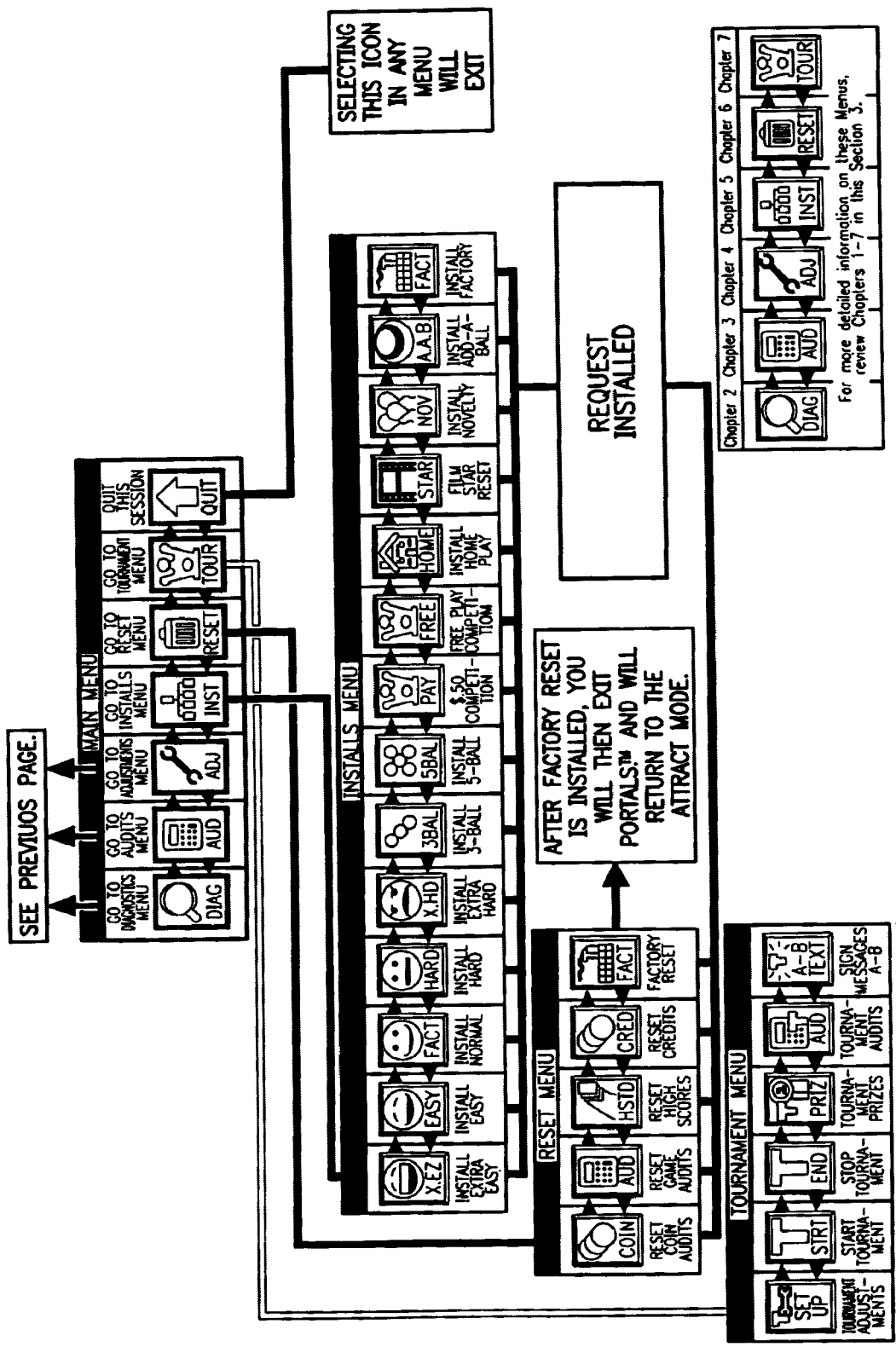

To set-up the pinball machine 10 to allow for tournament play, the operator may interact with a menu system or the like whereby operator input may be utilized to establish one or more of the tournament parameters. In the event that one or more of the parameters are not operator set, default values can be provided within the operating software of the pinball machine 10. An exemplary menu system is illustrated in FIGS. 2a and 2b, by which the operator may gain access to various tournament set-up menu icons 20. It will be appreciated that the menu icons could be displayed in a display 17 of the backbox and a menu access button, key-switch, or the like, could be located within the game cabinet behind a locked, access door, the activation of which would allow access by the game operator or owner to the menu system. Navigation of the menu system (which could also provide accesses to diagnostic functions, etc. as well as set-up features) could be accomplished by the operator activating additional buttons on the pinball machine, for example, the flipper buttons could be used to navigate left and right and the start button to select a menu item of interest for further processing in accordance with the menu software.

By way of example, the set-up menu may be used to allow the pinball machine operator to set adjustments for tournament play. Exemplary adjustments that may be set by the operator include, but are not limited to: 1) jackpot base (for tournaments in which prize units are to be distributed, e.g., tickets, tokens, cash, etc.—this establishes the initial jackpot); 2) jackpot increment (i.e., the amount by which the jackpot is to be incremented—which may be set to zero for a static jackpot); 3) jackpot increment event (e.g., allows the operator to determine what event increments the jackpot, for example, the jackpot is incremented when tournament game play commences); 4) jackpot maximum value (i.e., the ceiling for the jackpot); 5) number of prizes to award (i.e., how many of the top play scores are to be maintained in tournament play); 6) finishing positions that are to share in the jackpot (e.g., if five prizes are to be awarded, only the top three tournament play scores may be set to share in the jackpot); 7) jackpot distribution percentages (e.g., what percentage of the jackpot is to be distributed to the designated number of jackpot recipients); 8) prize descriptors (e.g., to designate that the jackpot is to be awarded in cash, tickets, etc. and/or to enter textual descriptions for prizes such as t-shirts, a free party, etc. that may be awarded in addition to or in cases where it is elected not to have a jackpot—means may also be provided to designate which award position is to be provided with each prize entered in this fashion); and 9) whether or not current leader information is to be displayed (e.g., whether names of tournament leaders and potential prizes to be won by those leaders are displayed). The operator may also be provided with the ability to set text messages that are to be displayed for the purpose of attracting potential game players. Access to these set-up features in the menu system may be accomplished, for example, by the pinball machine operator selecting the "tournament adjustments" menu item of FIG. 2 which will cause the pinball machine system to display one or more of the above parameters to allow said parameters to be operator set or modified. For example, by activating buttons associated with the pinball machine 10, the operator can set-up parameters of interest by using buttons to select an item from a list, increase or decrease values, enter alphanumeric characters, etc.

In addition to the game parameters above-noted, the menu system may also be utilized to establish a start date of the tournament and an end date of the tournament. The start date and the end date may be displayed so as to inform potential players that a tournament is about to commence, is in progress, or when it is to end. When the tournament play period is set, the pinball machine may automatically keep track of player game play scores during the designated period, provided the pinball machine has a real-time clock. In the case where the pinball machine does not have a real-time clock, the pinball machine operator may have to manually start and end tournament play. To allow the pinball machine operator to manually start and stop tournament play, menu icons "start tournament" and "stop tournament," respectively, can be selected by the operator. Thus, when the "start tournament" menu-icon is selected, the pinball machine tracks tournament game play statistic until the "stop tournament" menu-item is selected to end tournament play.

Once a tournament is completed, the operator may access information from memory 16 that is relevant to the completion of the tournament to thereby allow the prizes to be distributed by the operator. To this end, the operator may access tournament prize information via selection of the "tournament prizes" menu icon and use buttons to navigate, for example, a list of prize winners. Information collected by the pinball machine 10 relevant to the awarding of prizes may include, but need not be limited to, a prize winner name, a player-provided pin number (by which players identify themselves to the operator as a winner), and the prize to be given to each player it is determine is a prize winner. Player identification information may be collected when a player commences game play or may be collected after game play, for example, only when it is determined that the player is a potential prize winner (e.g., the player's play score qualifies them as having a top X score and X persons are to be awarded a prize). The information may be manually entered by the player, using the flipper buttons to scroll through and select alphanumeric characters, using a key-pad such as one typically found on a phone, using a card on which the information is encoded (in which case the pinball machine 10 would have a card reader), etc. While the operator may manually maintain a list of prize winners for a given tournament (for example it could be downloaded via a printer port for use in providing a hard-copy), it is contemplated that the pinball machine 10 may also display prize winners for one or more past tournaments so that players may inspect the display to know that they have won a prize. Still further, the operator may access the menu system to retrieve tournament audit information. For example, the pinball machine may track information such as: 1) plays (e.g., provides the total number of normal and/or tournament games played); 2) game earnings (e.g., provides the earnings from normal play and/or tournament play; and 3) number or tournaments played to date. Additional audit information may include net earnings (tournament cash less payout), prize pool total to pay out, and accumulated information concerning plays, earnings, etc. When collecting audit information concerning accumulated information, it is desired that this audit information not be capable of being reset.

While described in the context of a single pinball machine 10, it will be appreciated that the features of tournament play can also be implemented in a system of pinball machines connected via a network 20. In this case, the tournament game play scores on each of the networked pinball machines 10 would be used to determine which players qualify as prize winners. The game play scores utilized in determining prize winners as well as player information could be reported to a central repository 22 such as a server. Alternatively, information can be reported to and locally stored on one or more of the pinball machines 10 (e.g., one of the pinball machines can act as a server). By way of example only, each pinball machine could have circuitry 24, such as a modem or the like, by which game play scores and player information is transmitted to a central server via the network 20 which central server, as noted, could be located on one of the pinball machines 10 or remotely at an address 22 designated by a tournament sponsor and/or operator of the pinball machines. Furthermore, it will be appreciated that this address could be a designated Internet Web site address. It will also be appreciated that the pinball machines 10 can be wired directly to one another to exchange information. Still further, it is to be understood that any communication links between pinball machines 10 can be arranged in a variety of different manners, such as hub and spoke, circular, etc. Still further, tournament play information, such as potential prize winners during an on going tournament, past prize winners, etc., could also be reported back to each of the pinball machines when maintained at a central location for displayed on one or more displays associated with the respective pinball machines 10.

In some instances it may be desirable to provide tournament/league play as an add-on feature to a pinball machine 10. In this instance, it is contemplated that the pinball machine would be pre-programmed to allow for both normal play and tournament play, however, without an additional upgrade, the ability to activate tournament play would be inhibited. For example, if it is desired that a tournament play marquee 26 be utilized in connection with the pinball machine to advertise tournament play and/or tournament play information, the ability to activate tournament play would be inhibited in the absence of such a marquee 26. The presence of a marquee 26, which may be a dot matrix display, LCD display, or the like, would be sensed by the pinball machine 10 and would, in essence, act as a switch to allow for the activation of tournament play. Disconnecting the marquee 26 could also cause tournament play to be paused until such time as the marquee 26 is returned to operation. For allowing such a marquee to be easily installed, the pinball machine 10 may be provided with mounting posts for accepting driving circuitry 28 for the marquee 26, which would also be in communication with the operating circuitry of the pinball machine 10, as well as spottings for locating anchors used to attach the marquee 26 to the back box, game cabinet, or the like.

For additional information concerning the operation of a pinball machine that incorporates one or more of the described game play elements, reference may be had to the Operator Manual for the "RollerCoaster Tycoon" pinball machine published by Stern Pinball, Inc. which is incorporated herein by reference in its entirety.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A pinball machine, comprising:
   a downwardly sloping playfield;
   a mechanism for launching a ball from a lower portion of the playfield to an upper portion of the playfield along a side of the playfield;
   flipper mechanisms located at a lower end of the playfield for diverting the travel of the ball to prevent a ball from exiting the lower end of the playfield under the force of gravity where it is returned to the mechanism for launching a ball;
   a plurality of features on the playfield which, when interacted with by the ball, influence scoring during game play;
   a system for monitoring interaction between the ball and the plurality of features comprising a plurality of programming embodied on a computer readable medium having a first programming for determining game play scoring based upon the monitoring, a second programming to determine if one or more players are to be awarded a prize as a function of game play scoring, and a third programming for sensing a prize information display wherein the first programming remains operative while use of the second programming is inhibited if the third programming fails to sense the prize information display.

2. The pinball machine as recited in claim 1, wherein the system is programmable by an operator of the pinball machine to automatically start and stop the second programming.

3. The pinball machine as recited in claim 1, wherein the system allows for an operator of the pinball machine to manually start and stop the second programming.

4. The pinball machine as recited in claim 1, wherein the system allows for an operator of the pinball machine to set a number of players to be awarded a prize.

5. The pinball machine as recited in claim 1, wherein the prize comprises a progressive jackpot.

6. The pinball machine as recited in claim 5, wherein the system allows for an operator of the pinball machine to establish a starting value for the progressive jackpot.

7. The pinball machine as recited in claim 6, wherein the system allows for an operator of the pinball machine to establish an increment value for the progressive jackpot.

8. The pinball machine as recited in claim 7, wherein the system allows for an operator of the pinball machine to specify an event in response to which the progressive jackpot is incremented.

9. The pinball machine as recited in claim 8, wherein the system allows for an operator of the pinball machine to establish a maximum value for the progressive jackpot.

10. The pinball machine as recited in claim 1, wherein the a system accepts player information into the pinball machine and associates entered player information with a prize when it is determined that is to be awarded.

11. The pinball machine as recited in claim 10, wherein the system is used by a player to manually enter player information.

12. The pinball machine as recited in claim 10, wherein the system is used by a player to automatically enter player information.

13. The pinball machine as recited in claim 10, wherein player information comprises a personal identifier which can be provided by the player to identify the player as a player determined to be awarded a prize.

14. The pinball machine as recited in claim 10, wherein the system allows for displaying in the display a list of the one or more players and a corresponding prize to be awarded.

15. The pinball machine as recited in claim 1, wherein the system allows an operator of the pinball machine to enter information that identifies a prize.

16. The pinball machine as recited in claim 15, wherein the entered information comprises text.

17. The pinball machine as recited in claim 1, further comprising a communication device by which game play scoring is communicated via a network for use in connection with the second programming.

18. The pinball machine as recited in claim 17, wherein the network comprises an Internet.

19. The pinball machine as recited in claim 17, wherein the second programming resides on a further, remote pinball machine.

20. A pinball machine, comprising
a downwardly sloping playfield;
a mechanism for launching a ball onto the playfield;
flipper mechanisms located at a lower end of the playfield for diverting the travel of the ball to prevent a ball from exiting the lower end of playfield under the force of gravity whereby it is returned to the mechanism for launching a ball;
a plurality of features on the playfield which, when interacted with by the ball, influence scoring during game play;
a processor for controlling the function of the pinball machine including permitting game play in one of two player selectable modes:
  (i) tournament mode wherein game play allows a player to earn a score that is evaluated against other game play scores to determine if a prize is to be awarded; and
  (ii) normal mode wherein game play does not provide for a prize to be awarded; and
a player operated switch for permitting player selection of the mode of play at the beginning of each play of a game;
wherein the processor further inhibits game play in tournament mode when the processor fails to sense a display used to display information relevant to tournament mode.

21. The pinball machine as recited in claim 20, wherein tournament mode is enabled only during a time determined by an operator of the pinball machine.

22. The pinball machine as recited in claim 21, wherein a real-time clock is further used to determine enablement of tournament mode.

23. The pinball machine as recited in claim 20, wherein tournament mode allows an operator of the pinball machine to determine a number of prizes to be awarded.

24. The pinball machine as recited in claim 20, wherein the processor maintains a jackpot amount as the prize.

25. The pinball machine as recited in claim 24, wherein a starting value for the jackpot amount is operator specifiable.

26. The pinball machine as recited in claim 25, wherein an increment value for the jackpot amount is operator specifiable.

27. The pinball machine as recited in claim 26, wherein the jackpot is incremented only at the beginning of each game in tournament mode.

28. The pinball machine as recited in claim 27, wherein a maximum value for the jackpot amount is operator specifiable.

29. The pinball machine as recited in claim 25, wherein a number of prize winners is operator specifiable along with a percentage of the jackpot to be awarded to each of the prize winners.

30. The pinball machine as recited in claim 20, further comprising a communication device by which a game score in tournament mode is reportable to a remote system which is responsible for determining if a prize is to be awarded.

31. The pinball machine as recited in claim 30, wherein the remote system is in communication with a plurality of other pinball machines.

32. The pinball machine as recited in claim 31, wherein the remote system comprise another pinball machine.

33. The pinball machine as recited in claim 31, wherein the remote system comprises an internet server.

34. The pinball machine as recited in claim 33, wherein an internet address of the internet server is provided to the communication device by an operator of the pinball machine.

35. A pinball machine, comprising
a downwardly sloping playfield;
a mechanism for launching a ball onto the playfield;

flipper mechanisms located at a lower end of the playfield for diverting the travel of the ball to prevent a ball from exiting the lower end of playfield under the force of gravity whereby it is returned to the mechanism for launching a ball;

a plurality of features on the playfield which, when interacted with by the ball, influence scoring during game play;

a processor for controlling the function of the pinball machine including permitting game play in one of two player selectable modes:
  (i) tournament mode wherein game play allows a player to earn a score that is evaluated against other game play scores to determine if a prize is to be awarded; and
  (ii) normal mode wherein game play does not provide for a prize to be awarded; and a player operated switch for permitting player selection of the mode of play at the beginning of each play of a game;

wherein the processor further inhibits game play in tournament mode when the processor fails to sense a display used to display information relevant to tournament mode;

wherein normal mode allows a player to earn an increase in a number of times a rolling ball is supportable on the playfield and tournament mode provides a fixed number of times a rolling ball is supportable on the playfield.

36. The pinball machine as recited in claim 35, wherein game credits are used to begin each game, normal mode allows a player to earn game credits and tournament play does not allow a player to earn game credits.

37. The pinball machine as recited in claim 36, wherein a number of game credits used to begin a game in normal mode are less than a number of game credits used to begin a game in tournament mode.

38. The pinball machine as recited in claim 35, further comprising a display associated with the processor for displaying information relevant to a tournament.

39. The pinball machine as recited in claim 38, wherein the information is the prize to be awarded.

40. The pinball machine as recited in claim 39, further comprising a system for allowing an operator of the pinball machine to enter a text message descriptive of the prize to be awarded for display in the display.

41. The pinball machine as recited in claim 38, wherein the pinball machine comprises a backbox and the display is mountable to the top of the backbox.

42. The pinball machine as recited in claim 38, wherein the processor inhibits tournament mode when the display is unassociated with the processor.

43. The pinball machine as recited in claim 38, further comprising a system for accepting information from a player for identifying the player.

44. The pinball machine as recited in claim 43, wherein the display displays information from a player determined to be awarded the prize.

45. The pinball machine as recited in claim 43, wherein the system is used by a player to manually enter the information.

46. The pinball machine as recited in claim 43, wherein the system is used by a player to automatically enter the information.

47. The pinball machine as recited in claim 46, wherein the system comprises a magnetic card reader.

48. The pinball machine as recited in claim 43, wherein the system also accepts a personal identifier for a player.

* * * * *